Patented Oct. 26, 1943

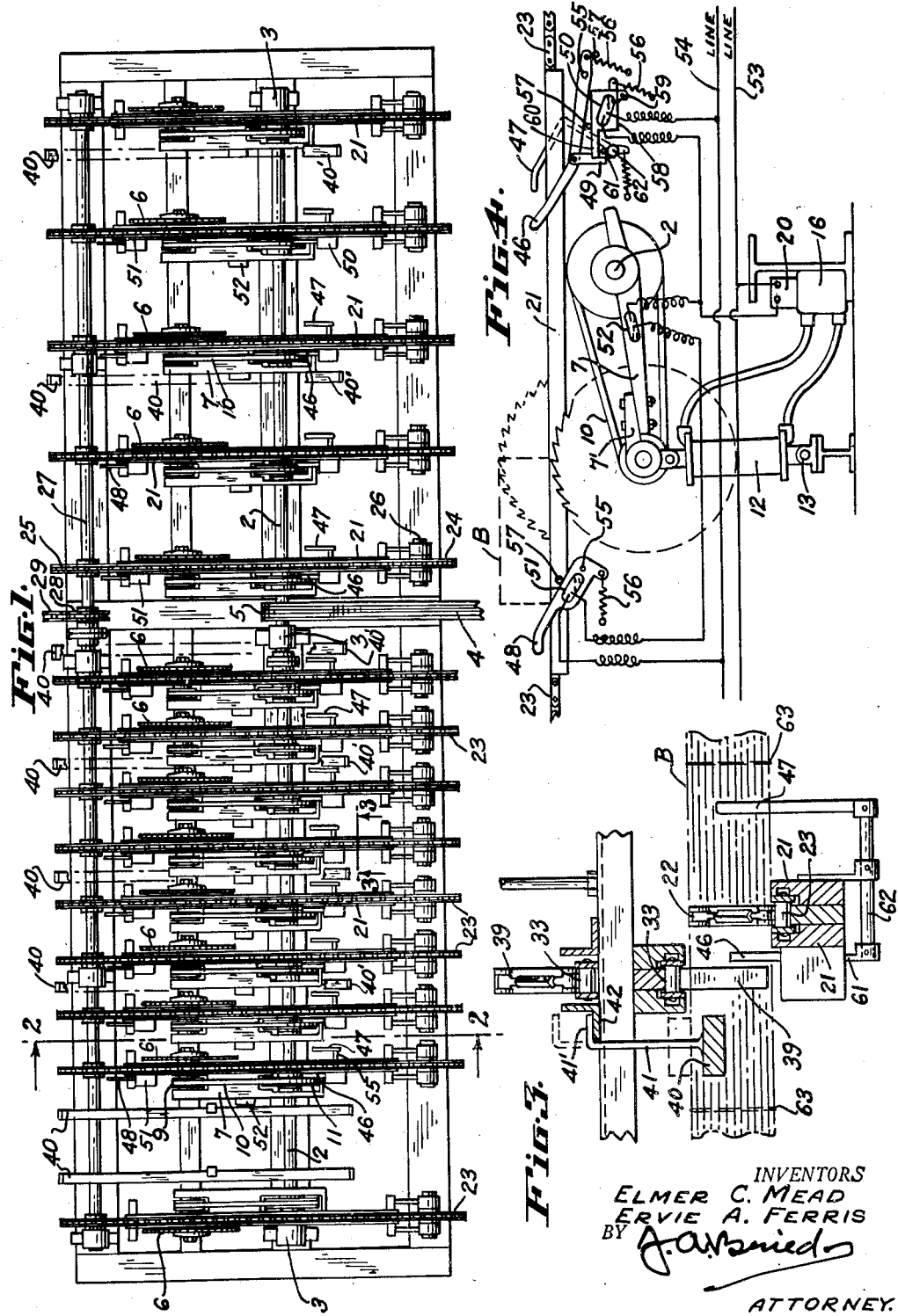

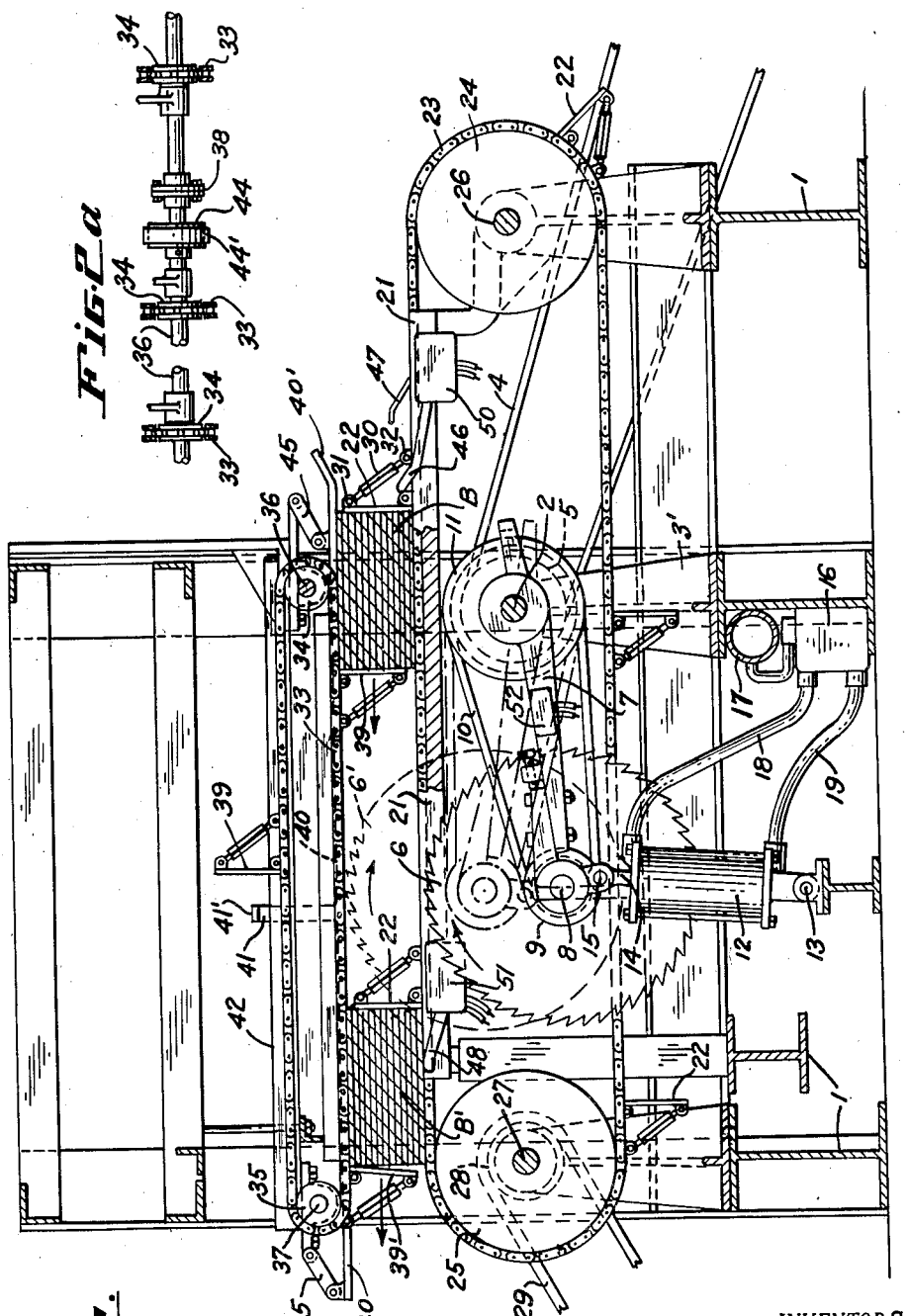

2,332,654

UNITED STATES PATENT OFFICE 2,332,654

AUTOMATIC LENGTH-SELECTING CUTOFF SAW

Elmer C. Mead, Scotia, and Ervie A. Ferris, Piedmont, Calif., assignors to The Pacific Lumber Company, San Francisco, Calif., a corporation of Maine Application June 8, 1942, Serial No. 446,273

4 Claims. (Cl. 143—41)

This invention relates to cross cutting circular saw equipment, and in particular to automatic length selecting cut-off saws, or so called "random length trimmers" which saw the extreme ends off of random length boards fed to them so as to bring the boards respectively to some standard length.

The object of the invention is to provide improvements in such saws in which a row of spaced circular saws is used and automatically the proper one rises to trim off the ends of the various length boards respectively. Also such a sawing machine adapted to receive and operate on previously assembled groups or bundles of boards. The various features and advantages of the invention will appear in the following description and accompanying drawings.

In the drawings:

Fig. 1 is a plan view of the machine showing the main features only including the row of spaced circular saws.

Fig. 2 is an enlarged cross sectional elevation of the machine as seen from line 2—2 of Fig. 1.

Fig. 2ª is a fragmentary side elevation of Fig. 2.

Fig. 3 is a still further enlarged view taken along the line 3—3 of Fig. 1 showing the relation of the board bundle feeding conveyors to the hold back conveyors and gravity hold-down bars.

Fig. 4 is a side elevational diagrammatic drawing of the saw controlling tripping switch levers and electric circuits.

Before describing the drawings in detail a general description of the machine will be given so as to make the detailed description easily understandable, and to this end the machine may be said to comprise a suitable elongated frame, and extending along which is a main power shaft driven from a nearby motor, and which shaft carries a row of spaced driving pulleys each belted individually to one of a corresponding row of large circular cross cut saws, each in a plane extending transversely of the machine frame and each mounted on a laterally extending swinging bracket pivoted about the axis of the main power shaft so that the saws may individually be raised or lowered by swinging the brackets on the axis of the power shaft.

Extending transversely across the frame between the spaced saws is a plurality of endless chain conveyors with lugs to move the bundles of boards across the saws, while the bundles are supported on transversely extending frame guides. And above the bundles are similar or upper or drag chains with projecting lugs which are engaged by the board bundles so as to place a resistance on the bundles being carried along by the lower chains. Weighted hold-down bars also ride over the tops of the bundles, and electrically operated means is provided, including arms which are tripped by the bundles, depending on their lengths, to operate suitable mechanism to raise the proper saw only to saw off or trim the extreme end of the bundle, the first saw of the row being always elevated to trim off the other end of the bundle. Also the very last saw of the row is fixed in elevated position to trim off all longer boards or bundles of boards to that predetermined maximum length. After any bundle has been trimmed off by an intermediate saw, the bundle passes over another trip arm, which makes an electrical contact and lowers the saw to its original position below the path of the bundles, though all saws continue revolving all the time.

In the drawings the frame is designated 1 and is shown composed of steel beams, channels, and angle iron, all suitably secured together as by welding, riveting, and/or bolting as may be desired. The main power shaft is designated 2 and is supported on spaced bearings 3 carried on brackets 3' suitably secured to the frame. 4 is the multiple belt driving the main shaft through a pulley 5, the belt receiving its power from a motor or other prime mover or pulley not shown.

The spaced saws are indicated at 6 carried on their swinging brackets 7 pivoted about shaft 2 and each saw is on a short mandrel 8 carried by the outer end of the bracket end to which a pulley 9 is secured over which passes a belt 10 for driving the saw, and which belt passes around one of the spaced pulleys 11 secured to the main shaft 2. All belts are preferably multiple strand V belts operating in multiple groove pulleys.

Each saw bracket is raised or lowered (from full to dotted line position of the saw) by an air or other fluid operated piston in a cylinder 12. The cylinder is pivoted at its lower end at 13 to the frame 1 and the piston rod 14 at its outer end at 15 to the saw bracket. The piston is preferably double acting from a suitable two-way valve 16 which upon alternate movements switches the compressed air from the line 17 to opposite ends of the cylinder through flexible hose lines 18, 19 while bleeding the other end to exhaust. The use of a double acting piston overcomes the uncertainty of gravity descent of the saw which might become stuck for some reason.

The valve 16 is operated by a solenoid or magnet 20 in a manner so that upon each closing of an electric contact the valve makes but one movement to switch the air lines 18 and 19 as stated, and as such electric solenoid operated valves are well known no detailed description need be given—but attention is directed to Bulletin #65 of Gallard-Henning Mfg. Co. of Milwaukee, Wisconsin, for one type of valve suitable for the purpose, though other types may be used.

The bundles of boards are shown at B and B', supported on the transverse frame members or guides 21 and as shown the bundles may be made up of about a dozen thicknesses of ordinary boards and several boards in width, or their equivalent all tied together with several wire bands or ropes, 63 in Fig. 3, so they can be handled and fed as units to the machine.

These bundles are pushed (from right to left in Fig. 2) along the supporting guides 21 by lugs 22 spaced on endless chain conveyors 23 passing over end sprockets 24—25 supported on shafts 26, 27, the latter of which is continuous for the length of the machine with the sprockets secured to it, and the shaft driven as by a sprocket 28 driven by a chain 29 from any suitable source of power. Lugs 22 being necessarily quite high in order to push against most of the boards in the bundles, are preferably angularly braced as at 30 to a rearward link of the chain 23 and hence pivoted at 31 and 32 to permit articulation in passing over the sprockets.

There are of course several of these pusher conveyors operating on each bundle at once, all depending on the length of the bundle.

As the bundles of boards move along in direction of the arrows, they ride under the lower run of the upper endless chains 33 which pass over sprockets 34 and 35 supported respectively on shafts 36 and 37, the former of which preferably extends the length of the machine with the sprockets secured to it so that all of the chains will have to move together, though the shaft may be coupled at about midway of its length as at 38 (Fig. 2ᵃ) so that it may be separated when running the saws on short lengths of wood only.

But in addition to the frictional load of making long bundles run all of the upper chains at once, a brake drum 44 is provided on the through shaft 36 to which a suitable brake 44' may be applied if desired to increase the load. (See Fig. 2ᵃ.)

The upper or drag chains also carry lugs 39 but they are spaced to come in front of each bundle so that the bundles must push them along and thereby move the chains around their sprockets, and as this takes considerable force it results in clamping the bundles between the lugs of the upper and lower chains as they are carried past the saws. Drag chains 33 are omitted from Fig. 1 for clarity.

To hold the bundles more firmly against the guides 21 spaced heavy iron bars or shoes 40 are provided to rest on top of the bundles as they move along. These shoes are spaced along the frame between the saws and are turned up at 40' at their forward ends so the bundles can slide under, and while they are free to rise and fall they are guided by stems 41 which are hooked over at their upper ends as at 41' (Fig. 3) to engage over a supporting angle or frame member 42 to limit the descent of the shoe so that the bundle will only have to lift it a short distance when sliding under it. For lower bundles, or single boards, these hooks would of course be made longer or adjustable in length if desired. The shoes are preferably each guided at the ends by a link 45 pivotally connected at opposite ends respectively to the shoe and to a fixed projection from the frame.

The spacing of lugs 39 on the upper chains 33 is such that there is always one ahead of the incoming bundle to be engaged by it as it is pushed along by the lugs 22 of the lower chains. The pivotal mounting of the lugs 39 causes them to swing out from the end of the trimmed bundle B at an angle as shown by the lug 39' and to thereafter quickly swing upwardly around sprocket 35 to clear a path for ejection of the trimmed bundles to suitable discharge guides or conveyors not shown.

Referring to the plan view Fig. 1 the second saw 6 from the left is shown spaced much greater distance from the first saw than are the next several succeeding saws. This is to provide for the minimum length bundle to be trimmed, and the spacing of succeeding saws is equal to the standard increase in lengths used in trade, and as mentioned the first and last saw of the series are blocked in upper or sawing position by any suitable means, or rigidly mounted in upper position as they must always trim off any lumber which is long enough to overhang them, it being understood that the bundles fed to the machine are of random lengths but are always fed in position to have their left hand ends project to the left of the first saw to be trimmed by it, while their right hand ends are automatically trimmed by the nearest saw to that end raised into action by the electric switch trips or arms operated by the bundles.

These trips are spring upwardly urged lever arms 46, 47, 48 pivoted to the frame or guides 21 and normally project above the lower chains 23 into the path of the bundles so as to be depressed successively by the bundles as they are moved toward the saws, and fly up again as the bundles pass over them. The general position of these trips or arms is shown in Fig. 1 wherein it will be seen that there is a set for each saw except the first and last which as stated are in fixed, upper cutting position, while the other saws are normally swung down on their pivoted brackets out of cutting position. In Fig. 1 it will also be noted (considering the left hand end of the machine to be its forward end since all bundles regardless of length are trimmed at their left hand end by the first saw) that arms 46 come first so as to be first depressed by a bundle not long enough to reach to its cooperating arm 47, but if the bundle is long enough to reach arm 47, then the latter arm is first in the path of travel of the bundle (see Fig. 2) and will be depressed first or before arm 46, and that arm 48 is depressed by the bundle as soon as the sawing of the bundle is completed, and released to fly up again by its spring when the bundle has passed it.

Arms 46 and 48 are arranged to tilt mercury electric switches to make operating contacts for the cylinder operating solenoid valve 16, while arm 47 if depressed first by a bundle too long to be sawed by the saw controlled by switch arm 46 throws out a latch 49 on arm 46 and renders it inoperative to tilt its mercury switch 50 and hence its saw stays down.

While the last arm 48, when up, tilts its switch 51 to break the circuit, when it is depressed by the bundle riding over it, it tilts its mercury switch to make a contact to lower the saw, but if the saw happens to be one which is already down its switch contact is rendered ineffective for the reason that its circuit is in series with a mercury switch 52 carried by the pivoted saw bracket 7 which is always tilted to circuit breaking position when the saw is down.

The above operations will be easily understood by reference to Fig. 4 wherein 53 is the main current wire leading to all the solenoid valves and while 54 is the other leg with taps taken off to the mercury switches as shown and which from the foregoing description need no further explanation except to say that each of the trip arms 46, 47 and 48 is pivoted at 55 and is normally pulled by a spring 56 to a stop 57. Mercury switch 51 may be mounted directly on arm 48, and switch 52 directly on the pivoted saw carrying bracket 7, but switch 50 is mounted on a separate block 58 itself pivoted at 59 and pulled back to a stop 57 by spring 56, while projecting from block 58 is a latch arm 60 engaged by the latch 49 which is pivoted to lever 46, but which may be kicked out of engagement upon first depressing lever 47 through means of a link or rod 61 operated by a small crank 62 or its equivalent carried on an extension of pivot 55 of lever 47 and which pivot is secured to lever 47 so as to turn with it.

From the above description of the construction and the operation of the various parts of the machine it will be seen (referring to Fig. 1) that any bundle of boards placed across two or more of the receiving conveyor chains 23 in position to trim off its left hand end by the first saw will extend to the right and trip some of the arms 46 and 47 and will be trimmed off on its right hand end by the saw whose kick-off trip arm 47 it does not reach, as this saw is the only one which will rise to cutting position.

In practice the bundles of lumber are within a few inches of some standard length as per spacing of the saws, and a guide (not shown) is provided to guide the left hand end of the bundle for minimum trimming off of that end by the first saw, which as stated is always fixed in cutting position.

Each saw bracket is extendable in length to tighten the belts, through the provision of a portion 7' being slidably adjustable along the main body 7 of the bracket.

Having thus described our improved construction in an automatic length selecting cut-off gang saw, and the manner of its operation, what we claim is:

1. In a cross cut sawing machine provided with a row of spaced circular saws and means for feeding various lengths of lumber across the saws, means operatively mounting the saws for individual swinging into and out of the path of the lumber for cutting the same, and three tripping arms for each saw to control the swinging of the same arranged in the path of the lumber to be tripped thereby as follows, a first arm preceding the saw controlling means for swinging the saw into cutting position, a second arm positioned for operation by the lumber after being cut by the saw controlling means for swinging the saw out of cutting position, and a third arm preceding the first arm in direction of movement of the lumber but spaced further in the length of the lumber controlling when tripped means rendering the subsequent tripping of the first arm ineffective for the purpose set out, and means returning all arms to starting position after the lumber has passed them.

2. In a cross cut sawing machine of the character described, a row of spaced circular saws arranged in parallel relation, guides for supporting lumber for movement past said saws for transversely cutting off said lumber, power operated means for so moving said lumber, means mounting said saws individually for swinging into and out of the path of said lumber, means for driving said saws, said saws being normally in non-cutting position out of the path of said lumber, and electric circuit controlling means determined by the length of and tripped by said lumber, as it is so moved for swinging one of said spaced circular saws into the path of said lumber for trimming off the minimum amount from the end of said lumber, electric circuit controlling means actuated upon the passing of said lumber returning said saw to non-cutting position, the means for swinging the saws into the path of the lumber comprising a bracket for each saw, means pivotally mounting the bracket at one end, means operatively mounting the saw at the other end of the bracket, a fluid operated power cylinder arranged for swinging the bracket, and electrically operated valve means for controlling the operation of the power cylinder, and the electric circuit controlling means tripped by the moving lumber comprising two pivotally supported tripping arms spaced along the path of movement of the lumber with a portion projecting into the path of the lumber so as to be successively tripped thereby, the first arm preceding the saw arranged upon being moved to operate an electric switch controlling an electric circuit for operating said valve means and swinging the saw to cutting position, and the second arm positioned to be tripped by the lumber after the cutting of the lumber and arranged upon movement to operate an electric switch controlling an electric circuit for operating said valve means to swing the saw out of cutting position.

3. In a cross cut sawing machine of the character described, a row of spaced circular saws arranged in parallel relation, guides for supporting lumber for movement past said saws for transversely cutting off said lumber, power operated means for so moving said lumber, means mounting said saws individually for swinging into and out of the path of said lumber, means for driving said saws, said saws being normally in non-cutting position out of the path of said lumber, and electric circuit controlling means determined by the length of and tripped by said lumber, as it is so moved for swinging one of said spaced circular saws into the path of said lumber for trimming off the minimum amount from the end of said lumber, electric circuit controlling means actuated upon the passing of said lumber returning said saw to non-cutting position, the means for swinging the saws into the path of the lumber comprising a bracket for each saw, means pivotally mounting the bracket at one end, means operatively mounting the saw at the other end of the bracket, a fluid operated power cylinder arranged for swinging the bracket, and electrically operated valve means for controlling the operation of the power cylinder, and the electric circuit controlling means tripped by the moving lumber comprising two pivotally supported tripping arms spaced along the path of movement of the lumber with a portion projecting into the path of the lumber so as to be successively tripped thereby, the first arm preceding the saw arranged upon being moved to operate an electric switch controlling an electric circuit for operating said valve means and swinging the saw to cutting position, and the second arm positioned to be tripped by the lumber after the cutting of the lumber and arranged upon movement to operate an electric switch controlling an electric circuit for operating said valve means to swing the saw out of cutting position, and an electric switch operated by the swinging of the saw bracket to non-cutting position for breaking the circuit and through which switch said last mentioned circuit extends.

4. In a cross cut sawing machine of the character described, a row of spaced circular saws arranged in parallel relation, guides for supporting lumber for movement past said saws for transversely cutting off said lumber, power operated means for so moving said lumber, means mounting said saws individually for swinging into and out of the path of said lumber, means for driving said saws, said saws being normally in non-cutting position out of the path of said lumber, and electric circuit controlling means determined by the length of and tripped by said lumber, as it is so moved for swinging one of said spaced circular saws into the path of said lumber for trimming off the minimum amount from the end of said lumber, electric circuit controlling means actuated upon the passing of said lumber returning said saw to non-cutting position, the means for swinging the saws into the path of the lumber comprising a bracket for each saw, means pivotally mounting the bracket at one end, means operatively mounting the saw at the other end of the bracket, a fluid operated power cylinder arranged for swinging the bracket, and electrically operated valve means for controlling the operation of the power cylinder, and the electric circuit controlling means tripped by the moving lumber comprising two pivotally supported tripping arms spaced along the path of movement of the lumber with a portion projecting into the path of the lumber so as to be successively tripped thereby, the first arm preceding the saw arranged upon being moved to operate an electric switch controlling an electric circuit for operating said valve means and swinging the saw to cutting position, and the second arm positioned to be tripped by the lumber after the cutting of the lumber and arranged upon movement to operate an electric switch controlling an electric circuit for operating said valve means to swing the saw out of cutting position, and an electric switch operated by swinging of the saw bracket to non-cutting position, for breaking the circuit and through which switch said last mentioned circuit extends, and a third tripping arm spaced in advance of the first arm but further along the machine in the length of the lumber, and means operated by the tripping of the third arm rendering the subsequent tripping of the second arm ineffective for swinging the saw to cutting position.

ELMER C. MEAD.
ERVIE A. FERRIS.